(12) United States Patent
Yamauchi

(10) Patent No.: US 7,784,949 B2
(45) Date of Patent: Aug. 31, 2010

(54) ILLUMINATOR WITH SWITCHING AND DIFFUSING ELEMENTS

(75) Inventor: Taisuke Yamauchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 855 days.

(21) Appl. No.: 11/534,997

(22) Filed: Sep. 25, 2006

(65) Prior Publication Data

US 2007/0085978 A1 Apr. 19, 2007

(30) Foreign Application Priority Data

Oct. 19, 2005 (JP) ............................. 2005-304114

(51) Int. Cl.
*G03B 21/26* (2006.01)
*G03B 21/00* (2006.01)
*G02B 5/32* (2006.01)
*G02B 5/30* (2006.01)
*G02B 27/28* (2006.01)

(52) U.S. Cl. .......................... 353/94; 353/122; 359/15; 359/494; 359/495

(58) Field of Classification Search ................... 353/34, 353/48, 82–83, 89, 94, 7, 122; 359/1, 11, 359/13, 15, 22–24, 204.1, 204.5, 494–495, 359/4–7; 348/40–41; 349/5–8, 196, 201–202
See application file for complete search history.

(56) References Cited

U.S. PATENT DOCUMENTS

| | | | | |
|---|---|---|---|---|
| 5,272,550 A | * | 12/1993 | Dickson et al. ................. | 359/3 |
| 5,471,327 A | * | 11/1995 | Tedesco et al. ................. | 359/15 |
| 5,629,784 A | * | 5/1997 | Abileah et al. ............... | 349/112 |
| 5,721,598 A | * | 2/1998 | Smith .......................... | 349/106 |
| 5,757,443 A | * | 5/1998 | Kobayashi ..................... | 349/5 |
| 5,808,759 A | * | 9/1998 | Okamori et al. ............... | 359/15 |
| 5,851,060 A | * | 12/1998 | Uchiyama et al. ............. | 353/94 |
| 6,094,240 A | * | 7/2000 | Hiyama et al. ................. | 349/9 |
| 6,185,016 B1 | | 2/2001 | Popovich | |
| 6,421,109 B1 | * | 7/2002 | Popovich ..................... | 349/202 |
| 6,651,886 B2 | * | 11/2003 | Gurevich et al. ............. | 235/454 |
| 6,687,030 B2 | * | 2/2004 | Popovich et al. ............. | 359/15 |
| 6,712,471 B1 | * | 3/2004 | Travis et al. .................... | 353/7 |
| 6,781,648 B2 | * | 8/2004 | Takahashi et al. ............. | 349/68 |
| 6,888,582 B2 | * | 5/2005 | Tominaga et al. .............. | 349/5 |
| 6,894,814 B2 | * | 5/2005 | Popovich et al. ............. | 359/15 |
| 7,035,015 B2 | | 4/2006 | Teijido | |
| 2001/0033400 A1 | * | 10/2001 | Sutherland et al. ............ | 359/15 |
| 2004/0100598 A1 | * | 5/2004 | Adachi et al. ............... | 349/113 |
| 2005/0099662 A1 | * | 5/2005 | Sutherland et al. ............ | 359/15 |

FOREIGN PATENT DOCUMENTS

JP    A 6-208089    7/1994

(Continued)

*Primary Examiner*—Tony Ko
*Assistant Examiner*—Jori S Reilly-Diakun
(74) *Attorney, Agent, or Firm*—Oliff & Berridge, PLC

(57) ABSTRACT

An illuminator includes a laser light source that irradiates laser light, a switch element that switches over between exiting optical paths of the laser light entered, and a plurality of diffusion-illuminating elements that allow the laser light entering through the exiting optical path to exit with diffusion. The plurality of diffusion-illuminating elements are to be superimposed together at least in a part of respective ones of exiting light thereby illuminating an illumination area.

13 Claims, 9 Drawing Sheets

FOREIGN PATENT DOCUMENTS

| | | |
|---|---|---|
| JP | A-10-293268 | 11/1998 |
| JP | A-2003-161834 | 6/2003 |
| JP | A-2004-252253 | 9/2004 |
| JP | A-2005-049851 | 2/2005 |
| JP | A-2007-013221 | 2/2007 |
| WO | WO 2007/013221 A1 | 2/2007 |

* cited by examiner

ILLUMINATOR WITH SWITCHING AND DIFFUSING ELEMENTS

BACKGROUND

The present invention relates to illuminators and image displays.

There is broadly known a projector adapted to illuminate a light modulator by an illuminator and project, with magnification, the image light exiting from the light modulator onto a screen through use of a projection system, such as a projection lens.

The illuminator of such a projector, conventionally, uses a metal halide lamp, a halogen lamp or the like. Recently, the use of a semiconductor laser (LD) is proposed in an effort to reduce the size of the illuminator and hence of the projector. The laser light source has advantages including well color reproducibility, capability of displaying a video image with brightness and contrast, and capability of instantaneous switching, besides the reduction in size.

However, because laser light is coherent, a speckle pattern with a random distribution of light and dark points arises in the video light projected with magnification. The speckle pattern is caused by the interference in irregular phase relationship of between those of light exiting from various points of the projection system. The video image having such a speckle pattern is problematic because of inflicting a flashy flicker feeling upon an observer.

In order to overcome the problem, JP-A-6-208089 discloses a display that, by vibrating/rotating a diffusion element due to an external force, a speckle pattern is changed in a time shorter than a rewrite time of display perceivable by the human so that the observer at his/her eyes is free from catching the speckle through the averaging based on integration effects.

However, the art of JP-A-6-208089 requires a mechanical driver, such as a motor, to vibrate/rotate the diffusion element, thus increasing the device size and the cost thereof. In addition, it costly requires a diffusion element durable against an external force because an external force is applied from the driver to the diffusion element. Furthermore, with a simple reciprocal motion, a pattern integration effect decreases because of once stoppage, resulting in a speckle pattern perception even if making an averaging. Incidentally, speckle becomes less susceptible to perceive as vibration/rotation speed of the diffusion element increases. However, there is a difficulty in vibrating the diffusion element of the device at high speed because it has a significant size. In addition, if mechanically vibrated, noise problematically arises.

SUMMARY

An advantage of some aspects of the invention is to provide an illuminator and image display that speckle patterns can be eliminated without using a mechanical drive.

According to a first aspect of the invention, an illuminator comprises: a laser light source that irradiates laser light; a switch element that switches over between exiting optical oaths of the laser light entered; and a plurality of diffusion-illuminating elements that allow the laser light entering through the exiting optical path to exit by diffusion; the plurality of diffusion-illuminating elements are to be superimposed together at least in a part of respective ones of exiting light thereby illuminating an illumination area.

In this structure, by switching over between the exiting optical paths of laser light by use of the switch element, the illumination area can be illuminated with light in a plurality of kinds different in light and dark points. This averages over the light and dark points of illumination light and hence suppresses against a speckle pattern.

It is preferable that the switch element is a hologram structure having an optical function layer alternately layered with a polymer having birefringence and a liquid crystal, and an electric-field application device for the optical function layer.

With this structure, the exiting optical paths can be switched over without using a mechanical drive. Accordingly, the illuminator can be reduced in size and decreased in manufacturing cost. Meanwhile, high-speed switchover of exiting optical paths is made feasible, and noise is prevented from generating.

It is preferable that the diffusion-illuminating element is a diffraction optical element for generating diffraction light.

With this structure, a desired diffusion-illuminating element can be formed at low cost.

It is preferable that the plurality of diffusion-illuminating elements are to be superimposed together substantially in all part of respective ones of exiting light thereby illuminating the illumination area.

With this structure, light and dark points can be averaged over nearly all part of illumination light, thus effectively suppressing against a speckle pattern.

It is preferable that the switch element is provided in plurality on an optical path of the laser light.

With this structure, the illumination area can be illuminated with light in multiplicity of kinds different in light and dark points. This averages the light and dark points of illumination light, hence suppressing against a speckle pattern.

It is preferable that the laser light source is provided in plurality.

With this structure, although the individual laser light source is coherent, a plurality of laser light sources wholly is incoherent. Accordingly, the illumination, area can be illuminated with laser light in plurality of kinds different in light and dark points. This averages the light and dark points of illumination light, hence suppressing against a speckle pattern.

According to a second aspect of the invention, an image display comprises the illuminator, a light modulator that is illuminated by the illuminator, and a projection system that projects light of from the light modulator.

With this structure, an image display can be provided that is excellent in display quality with a speckle pattern suppressed.

BRIEF DESCRIPTION OF THE DRAWINGS

The invention will be described with reference to the accompanying drawings, wherein like numbers reference like elements.

DETAILED DESCRIPTION OF EMBODIMENTS

Figure 1:
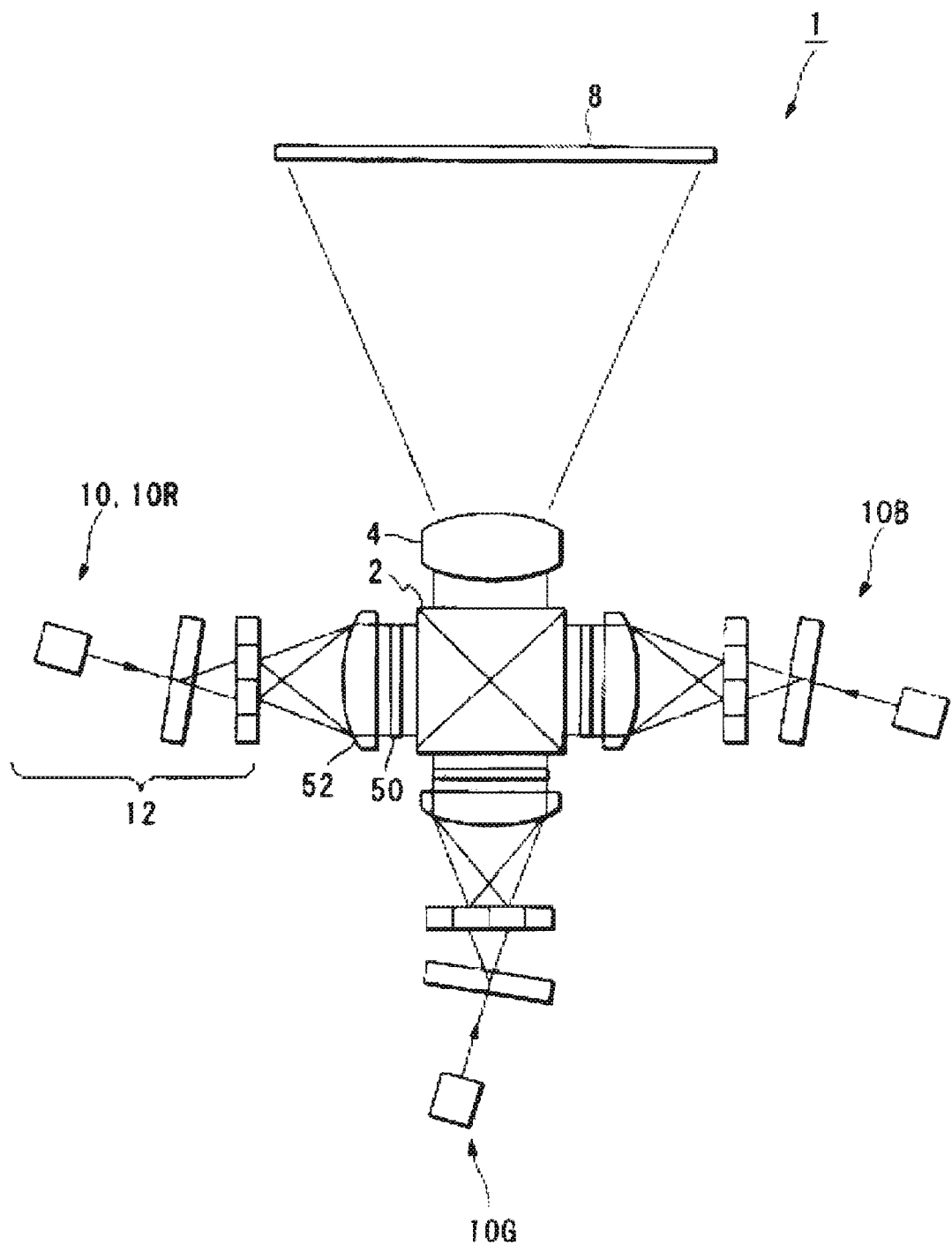
FIG. 1 is a schematic structural view of an image display according to a first embodiment.

With reference to the drawings, description is now made on embodiments of the present invention. Note that, in the drawings for use in the description, the members are suitably changed in scale in order to illustrate those in recognizable sizes.

First Embodiment

Referring to FIGS. 1 to 8, description is made on an image display according to a first embodiment of the invention. FIG. 1 is a schematic structural view of an image display according to the first embodiment.

Image Display

The image display 1 in this embodiment is a projection image display (projector), as shown in FIG. 1. In the center, there is arranged a cross-dichroic prism 2 in a square form. In three directions about the cross-dichroic prism 2, there are arranged a red optical system 10R, a green optical system 10G and a blue optical system 10B. In the remaining one direction, a projection system 4 is arranged.

In the cross-dichroic prism 2, dielectric multi-layer films for reflecting red light and blue light are formed nearly in an X-form along the interfaces of between four right-angular prisms. The respective colors of image light, exited the color-light optical systems 10R, 10G, 10E, are combined together in the cross-dichroic prism 2 and allowed to exit toward the projection system 4. The projection system 4 projects the combined image light, with magnification, to a screen 8. This provides display of a color image on the screen 8.

Each of the color-light optical systems 10 has an illuminator 12 that emits a color of light, a field lens 52 that collimates the light exiting from the illuminator 12 and allows it to enter a light modulator 50, and a light modulator 50 that modulates the light incident thereupon and produces a color of image light. The light modulator 50 is structured by a liquid-crystal light valve, etc. having a liquid-crystal panel, and a polarizer and retardation plate sandwiching the liquid-crystal panel. The liquid-crystal panel has a liquid-crystal layer sandwiched between a pair of substrates. On one of the electrodes in pair, there are formed pixel electrodes arranged in a matrix form and switch elements, such as thin-film transistors, for energization control to the pixel electrodes. On the other substrate, a common electrode is formed. By driving the liquid crystal through applying a voltage to between the pixel electrode and the common electrode, the liquid crystal is driven to modulate the transmittance of incident light on a pixel-by-pixel basis. This allows for producing image light. Note that the light modulator 50 is not limited to the transmission liquid-crystal light valve but can employ a reflective liquid-crystal light valve, a digital micro-mirror device or the like.

Illuminator

Figure 2:
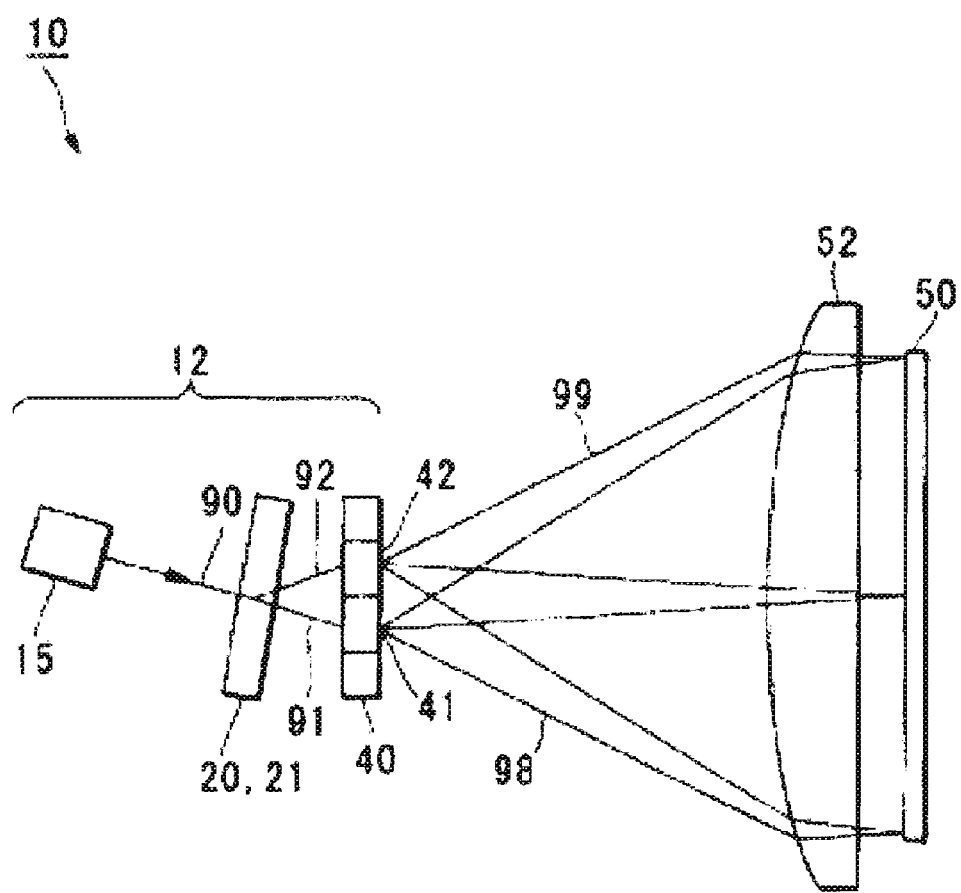
FIG. 2 is a schematic structural view of an illuminator according to a first embodiment.

FIG. 2 is a schematic structural view of an illuminator according to the first embodiment. The illuminator in the first embodiment has a laser light source 15 that emits laser light 90, a switch element 21 that changes over between the exiting optical paths 91, 92 for laser light 90, and a plurality of diffusion-illuminating elements 41, 42 that allow the laser light entering through the optical paths 91, 92 to exit with diffusion. The plurality of diffusion-illuminating elements 41, 42 superimpose nearly all of exiting light 98, 99 together thereby illuminating an incident surface of the light modulator 50.

Laser Light Source

The laser light source 15 employs a semiconductor laser (LD). The semiconductor laser is to amplify and emit light of from a semiconductor device through stimulated emission. The semiconductor laser, for emitting red light, is formed by growing an AlGaInP-based compound semiconductor crystal on a substrate, say, of gallium arsenic (GaAs). It employs a double-hetero structure that an active layer, such as of GaInP, is sandwiched between the cladding layers, say, of AlGaInP. Due to this, because the active layer having a narrower bandgap is clamped between the cladding layers having a broader bandgap, a population inversion status can be efficiently formed within the active layer. Meanwhile, because the active layer having a greater refractivity is sandwiched between the cladding layers having a smaller refractivity, the light generated in the active layer is totally reflected upon the interface to the cladding layer, thus realizing optical feedback. This causes a stimulated emission and light amplification (laser oscillation), to emit laser light at an end face of the semiconductor laser. The laser light is intense and matched in wavelength and phase, which makes it possible to secure lightness on the image display.

Incidentally, a semiconductor laser, for emitting blue light, is formed by growing a GaInN-based compound semiconductor crystal on a substrate, say, of sapphire (Al2O3). Meanwhile, a laser light source, for emitting green light, can be structured by a DPSS (diode pumping solid state) laser or the like. The DPSS laser has an excitation laser (pumping laser), a solid laser medium to be excited by the excitation laser, an oscillator for causing laser oscillation in the light generated by the solid laser medium, and a wavelength conversion element for converting the laser light oscillated by the oscillator into a desired wavelength of laser light.

Switch Elements

Meanwhile, in the illuminator 12 of this embodiment, there is provided a switch element 21 that switches over between optical paths 91, 92 for the laser light 90 entering from the laser light source 15. Note that, in this embodiment, a switch device 20 is constituted by one switch element 21. The switch element 21 is made by a hologram structure. The hologram structure employs a holographic polymer dispersed liquid crystal (HPDLC).

Figure 3A:
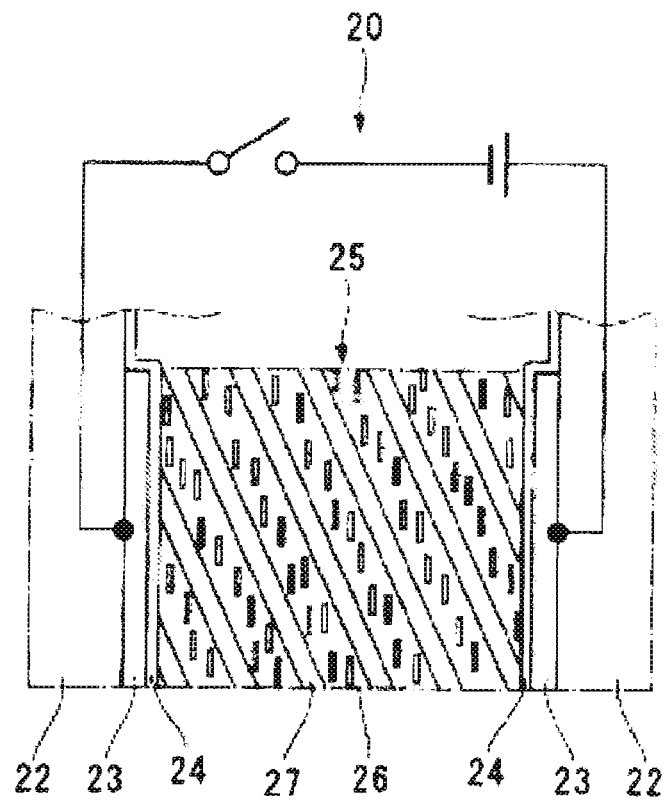
FIGS. 3A and 3B are side sectional views of a hologram structure.
Figure 3B:
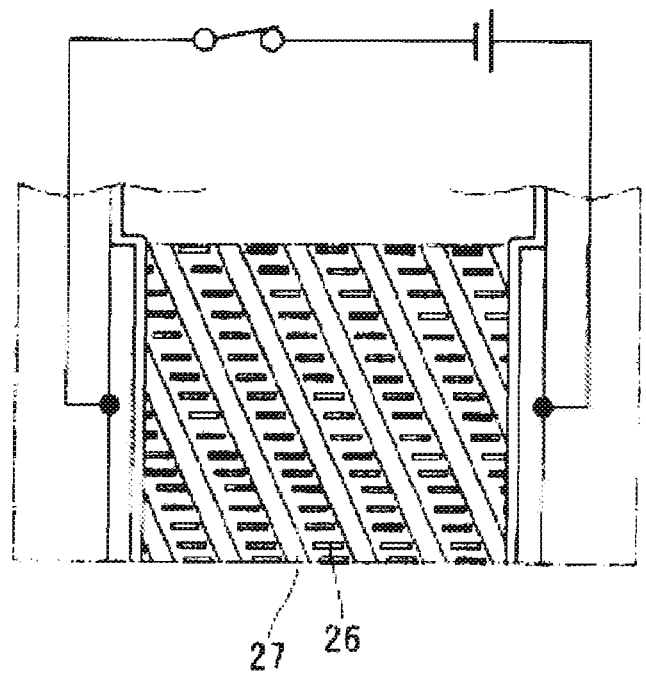

FIGS. 3A and 3B are side sectional views of the hologram structure wherein FIG. 3A shows a state in the absence of electric field while FIG. 3B a state in the presence of electric field. As shown in FIG. 3A, in the hologram structure 21, there are oppositely arranged a pair of substrates 22 formed of transparent material, such as glass. On the inner surface of the substrate 22, there are layered an electrode 23 of a transparent conductive material such as indium-tin oxide (ITO) and an alignment film 24 of polyimide or the like. The alignment film 24, at its surface, is processed by rubbing in a constant direction.

An optical function layer 25 is sandwiched between the substrates 22 in pair. The optical function layer 25 has an interference fringe texture having periodic, alternate layers of a polymer 27 having birefringence and a liquid crystal 26. Meanwhile, by the alignment film 24, alignment is provided in a certain direction for both the polymer precursor forming the polymer 27 and the liquid-crystal molecules forming the liquid crystal 26. The liquid crystal, used here, can employ, say, a nematic liquid crystal TL-202, E8 (by Merk Japan)

while the polymer precursor can employ, say, biphenyl methacrylate. Incidentally, the polymer precursor is desirably in a blending ratio of 5-30 wt %.

Figure 4:
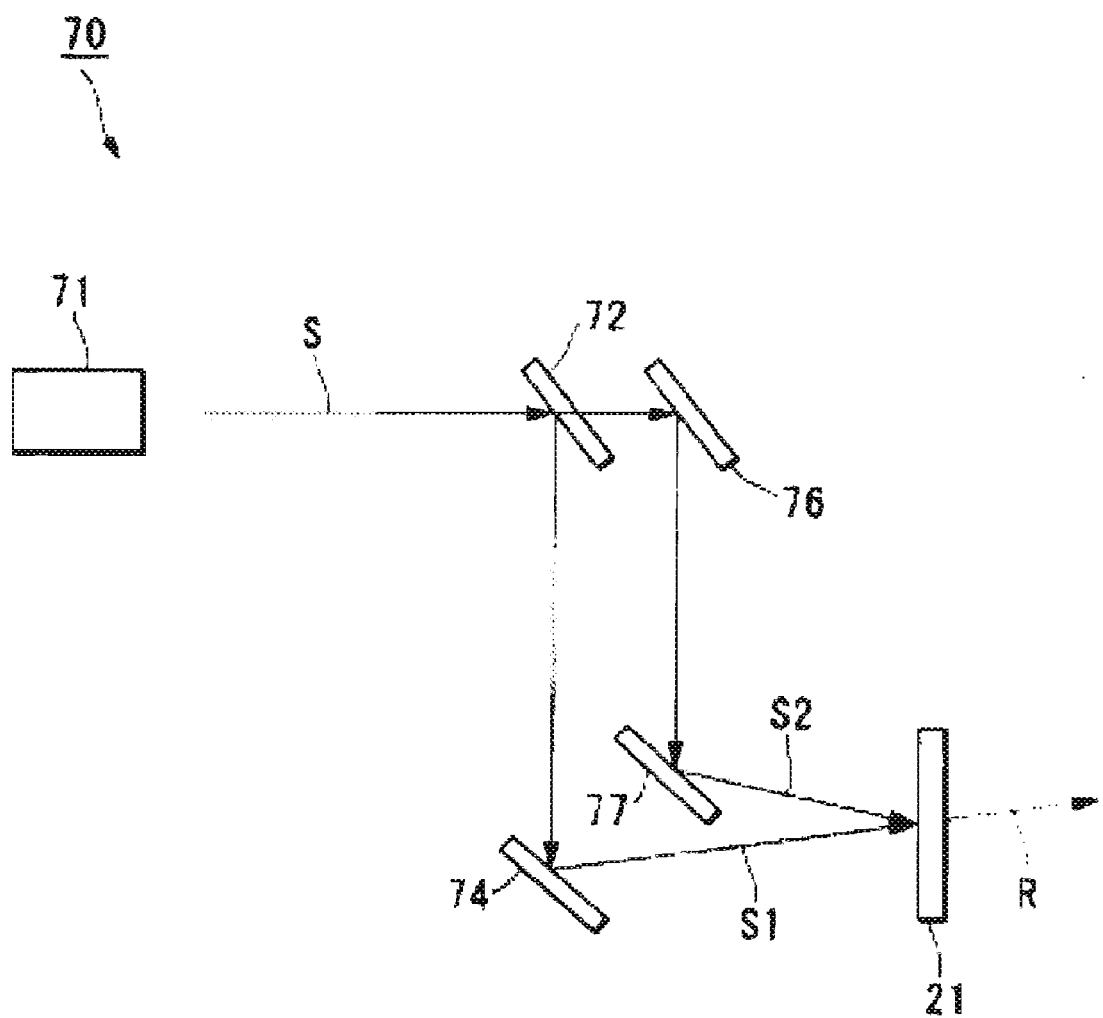
FIG. 4 is an explanatory view of a manufacturing method for a hologram structure.

FIG. 4 is an explanatory view on a method to fabricate a hologram structure. The hologram structure, described above, is fabricated by using a two-luminous-flux printer 70. The two-luminous-flux printer 70 is roughly constructed with a laser light source 71, a beam splitter 72 for branching laser light S into two components, a mirror 74 for guiding one S1 of the two laser light components branched, as a object wave, to the structure 21, and mirrors 76, 77 for guiding another S2 of the two laser light components branched, as a reference wave, to the structure 21.

By using the two-luminous-flux printer 70, light is illuminated in two directions at predetermined angles to the structure 21 that is in a state the polymer precursor is aligned together with the liquid crystal. Thereupon, the polymer precursor is polymerized at a point where light intensity (amplitude) is greater, by the light interference in two directions. This forms polymers 27 shown in FIG. 3A whereby a plurality of polymers 27 becomes exhibiting an interference-fringe texture. This forms a hologram structure 21.

Figure 5A:
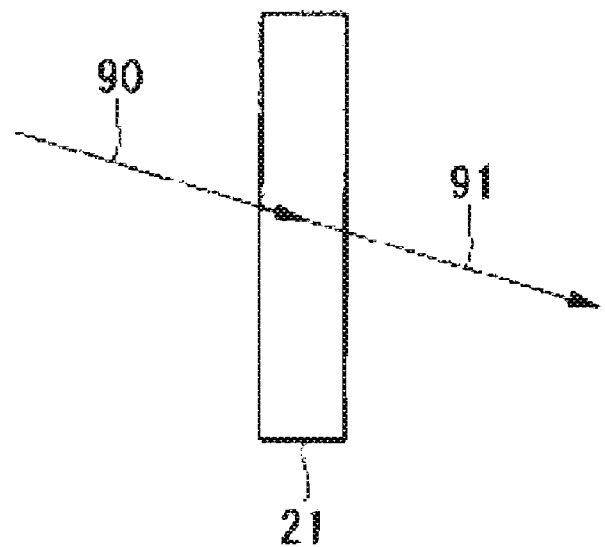
FIGS. 5A and 5B are explanatory views of a use method for a hologram structure.

Referring back to FIG. 3A, in the hologram structure 21 in the absence of electric-field applied, the polymer precursor constituting the polymer 27 and the liquid-crystal molecules forming the liquid crystal 26 are aligned in the same direction. For this reason, the liquid crystal 26 and the polymer 27 are nearly matched in their refractive indexes. Accordingly, the light entering at one substrate passes the optical function layer 25 and exits through the other substrate. Namely, the light 90 entering the hologram structure 21 is to exit along a exiting optical path 91 in line therewith, as shown in FIG. 5A.

Figure 5B:
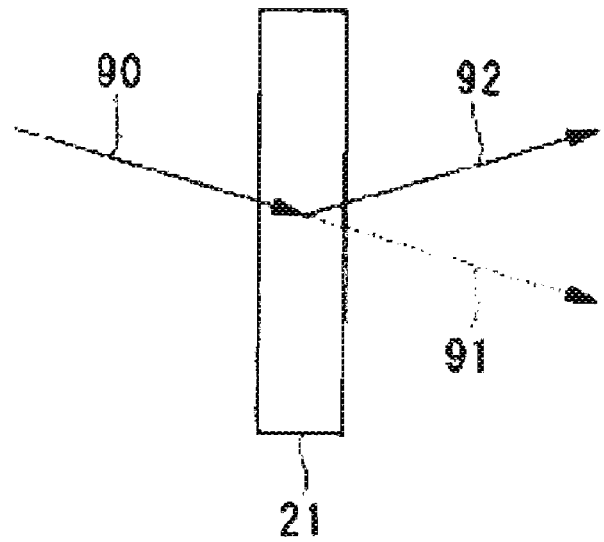

On the contrary, in the hologram structure 21 in the presence of electric-field applied, only the liquid-crystal molecules of the liquid crystal 26 orient along the direction of the electric field, as shown in FIG. 3B. An interference-fringe texture appears due to the polymer 27. This results in a difference in refractive index between the liquid crystal 26 and the polymer 27. Consequently, when a wavelength of light, corresponding to the pitch of the interference-fringe texture of the polymer 27, is incident in a predetermined direction upon one substrate, it is refracted in a predetermined direction and exits through the other substrate. Specifically, the light entering, in the same direction as the reference light S2 shown in FIG. 4, is refracted toward the exiting optical path R of the object wave S1. Namely, as shown in FIG. 5B, the light 90 entering the hologram structure 21 is to exit along an exiting optical path 92 different from the exiting optical path 91 extending in line therewith.

The laser light source 15 and the hologram structure 21, shown in FIG. 2, are set up in such relative positions that laser light is allowed to enter the hologram structure 21 in the same direction as the FIG. 4 reference wave S2. Consequently, the FIG. 2 hologram structure 21 is arranged to switch over between the optical paths 91, 92 for incident light 90.

Incidentally, the present embodiment was structured to align in a constant direction the polymer precursor constituting the polymer 27 and the liquid crystal molecules forming the liquid crystal 26, as shown in FIG. 3A. However, those may be in a texture with a twist alignment at between the substrates 22 in pair. Specifically, twist alignment can be realized by adding a slight amount of a chiral dopant R1011 (by Merk Japan) to the optical function layer 25. By adopting such twist alignment, it is possible to reduce the polarization dependence upon interference and scatter effects.

Meanwhile, the liquid-crystal molecules may be oriented random in the absence of electric-field application to provide different refractive indexes of between the liquid crystal and the polymer so that the liquid-crystal molecules are oriented in the direction of electric field in the presence of electric-field application to match the refractive indexes of between the liquid crystal and the polymer. In this case, the entering light is to be allowed to refract by and exit out of the hologram structure in the absence of electric field whereas the entering light is allowed to transmit, as it is, the hologram structure in the presence of electric field.

The switch element may employ a micro-mirror device using a MEMS (micro-electro mechanical system) or the like, in place of the hologram structure.

Diffusing Illuminator Means

As shown in FIG. 2, the illuminator 12 in this embodiment has the diffusion-illuminating elements 41, 42 in plurality each of which is to diffuse the laser light entering through the exiting optical path 91, 92 and then exit there. In this embodiment, the two diffusion-illuminating elements 41, 42 constitute a diffusion illuminator 40. The diffusion-illuminating element 41 is formed by a diffraction optical element. The diffraction optical element employs a computer-generated hologram (CGH).

The diffraction optical element 41 has the functions of illumination-area setting, diffusion-light generation (luminous intensity uniformization) and magnifying illumination. As for the illumination-area setting function, the diffraction optical element 41 produces diffraction light based on the laser light emitted from the laser light source 15 and illuminates the light modulator 50 in a predetermined illumination area of its light-incident surface thereof by means of the diffraction light. In this embodiment, the diffraction optical element 41 is to illuminate the light-incident surface of the optical modulator 50 in a rectangular illumination area. In the diffusion-light producing function, the diffraction light generated by the diffraction optical element 41 is diffusion light to illuminate a predetermined area. The diffraction optical element 41 illuminates the light-incident surface of the light modulator 50 in a predetermined illumination area by means of the diffusion light (diffraction light) thereby uniformizing the luminous intensity throughout the illumination area. In the magnifying illumination function, the diffraction optical element 41 illuminates the light-incident surface of the light modulator 50 in an illumination area broader than the area of the light-exit surface of the diffraction optical element 41 through which light exits. Namely, the diffraction optical element 41 serves as so-called a magnifying system (magnifying illumination system).

Figure 6A:
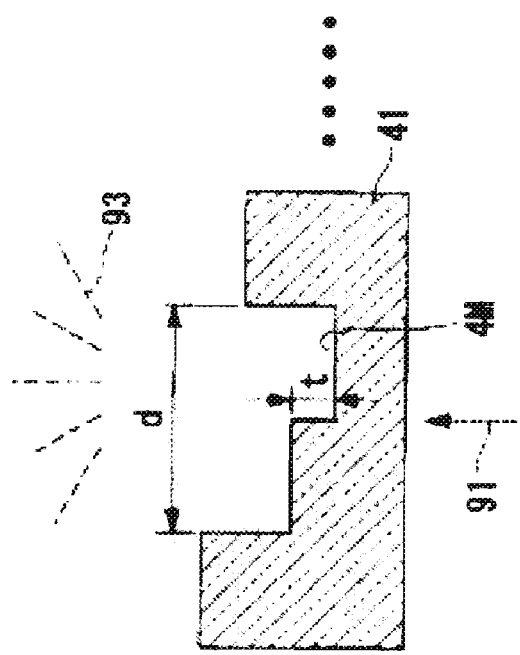
FIGS. 6A and 6B are typical views showing an example of a diffraction optical element.
Figure 6B:
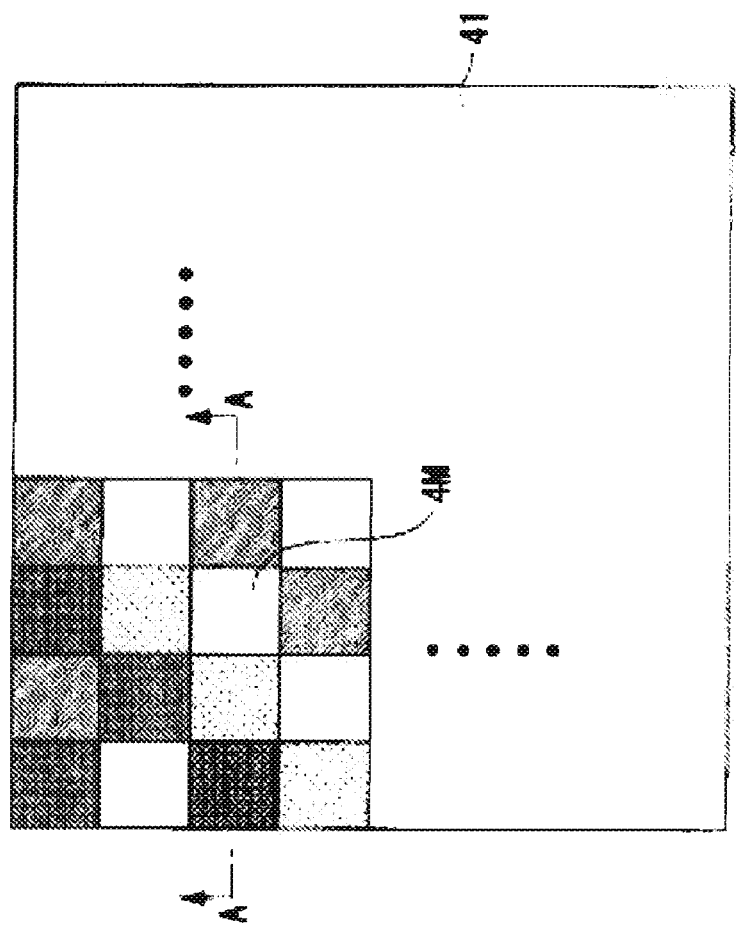

FIGS. 6A and 6B are typical views showing one example of the diffraction optical element wherein FIG. 6A is a plan view while FIG. 6B is a sectional view taken on line A-A in FIG. 6A as viewed along the arrow. The diffraction optical element shown in FIG. 6 has a plurality of rectangular concaves (concavo-convex topology) 4M in the surface thereof. The concaves 4M are different in depth one from another. Meanwhile, the convexes existing between the concaves 4M are different in depth one from another. By suitably regulating the surface condition of the diffractive optical element 41 including the pitch d of the concaves 4M and the depths (convex heights) t of the concaves 4M, predetermined functions (illumination-area setting function, diffusion-light generating function and magnifying illumination function) can be provided to the diffraction optical element 41. The design technique for optimizing the surface condition includes predetermined operation approach (simulation approach), e.g. iterative Fourier process.

Figure 7:
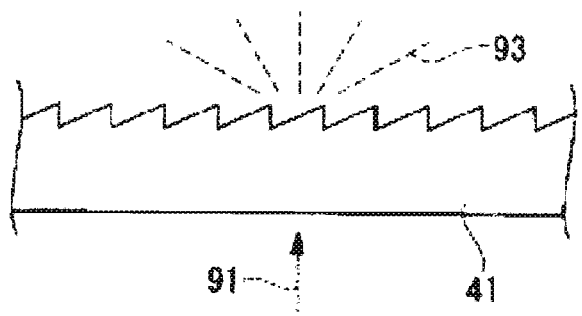
FIG. 7 is a side sectional view showing another example of a diffraction optical element.

Note that the diffraction optical element 41 is not limited to those having rectangular concaves 4M but may use those having a surface combining the planes facing in different directions one from another. For example, the diffraction optical element 41 may be in a form having triangular concaves having slant surfaces, as shown in FIG. 7. Otherwise, the diffraction optical element 41 may be in a form having both an area having rectangular concaves 4M as shown in FIG. 6 and an area having triangular concaves as shown in FIG. 7. By optimizing the surface condition, it is possible to form a diffraction optical element 41 having desired functions.

Referring back to FIG. 2, the diffusion illuminator 40 is structured with a plurality of diffraction optical elements 41, 42 that are arranged in a two-dimensional form. The diffraction optical elements 41, 42 are arranged corresponding to the plurality of exiting optical paths 91, 92 of from the switch element 21. Those are set up such that diffusion light exiting the diffraction optical elements 41, 42 at least a part thereof can be superimposed together on the light-incident surface of the light modulator 50. Note that the diffusion light exiting the diffraction optical elements 41, 42 in nearly all part thereof is preferably superimposed together on the light-incident surface of the light modulator 50. Such a setting is feasible by optimizing the surface condition of the diffraction optical elements 41, 42.

Incidentally, the diffusion-illuminating elements may employ fly-eye lens array in place of the diffraction optical elements.

The image display and illuminator in this embodiment is structured as described so far.

Image Display Method

Referring FIGS. 1 and 2, description is now made on an image display method using the image display according to the present embodiment.

As shown in FIG. 2, laser light 90 is irradiated from the laser light source 15. In the absence of electric-field application to the hologram structure 21, the laser light 90 transmits straight the hologram structure 21 and exits it onto an exiting optical path 91. The light on the exiting optical path 91 enters the diffraction optical element 41 of the diffusion illuminator 40 where it is converted into diffusion light 98. The diffusion light 98 is converted by a field lens 52 into collimated light, thus illuminating nearly all part of the incident-surface of the light modulator 50.

In the presence of electric-field application to the hologram structure 21, the laser light 90 refracts in the hologram structure 21 and exits there onto an exiting optical path 92. The light on the exiting optical path 92 enters the diffraction optical element 42 where it is converted into diffusion light 99. The diffusion light 99 is converted by a field lens 52 into collimated light, thus illuminating nearly all part of the incident-surface of the light modulator 50.

As shown in FIG. 1, the respective ones of color image light exiting the optical modulators 50 of the color-light optical systems 10R, 10G, 10B are combined together in the cross-dichroic prism 2, and allowed to exit toward the projection system 4. The projection system 4 projects, with magnification, the combined image light onto the screen 8. Due to this, a color image is displayed on the screen 8.

In the meanwhile, because the laser light emitted from the laser light source is coherent, a speckle pattern with a random distribution of light and dark points occurs in the video-image light projected with magnification. The speckle pattern is caused by the interference in irregular phase relationship of between those of light exiting from the respective points of the projection system. The image having such a speckle pattern is problematic because of inflicting a flashy flicker feeling upon an observer.

For this reason, the switch element 21 shown in FIG. 2 is switched at high speed over between the exiting optical paths 91, 92 so that the light modulator 50 can be illuminated by the rapid switchover between diffusion light 98 and 99. The exiting optical paths 91, 92 are switched over such that the illumination-light switchover by the light modulator 50 is shorter in time than the switchover visually perceivable by the human. Specifically, the electric-field application to the hologram structure 21 is switched at a frequency of nearly 30 Hz or higher so that illumination to the light modulator 50 can be switched approximately 60 cycles per second, thereby effecting illuminations based on diffusion light 98 and that based on diffusion light 99 nearly 30 cycles per second. By thus illuminating the light-incident surface of the light modulator 50 repeatedly with a plurality of types of diffusion light 98, 99 that are different in light and dark points, averaging is done over the light and dark points of illumination light by integration effects. This can suppress against speckle patterns.

Figure 8A:
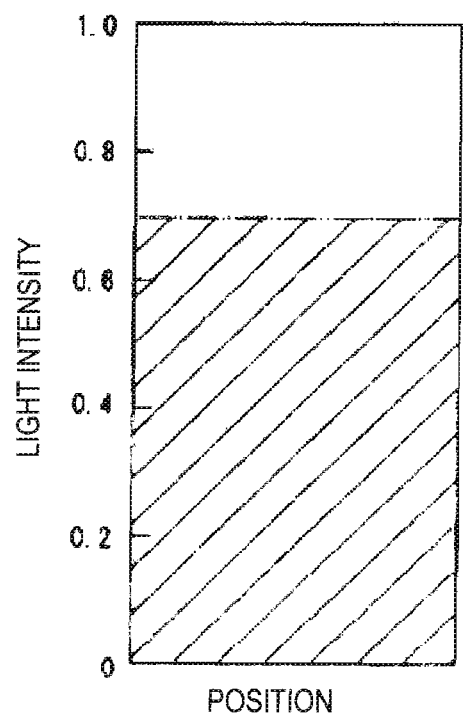
FIGS. 8A and 8B are graphs showing a simulation result of a light-intensity distribution of video image light.
Figure 8B:
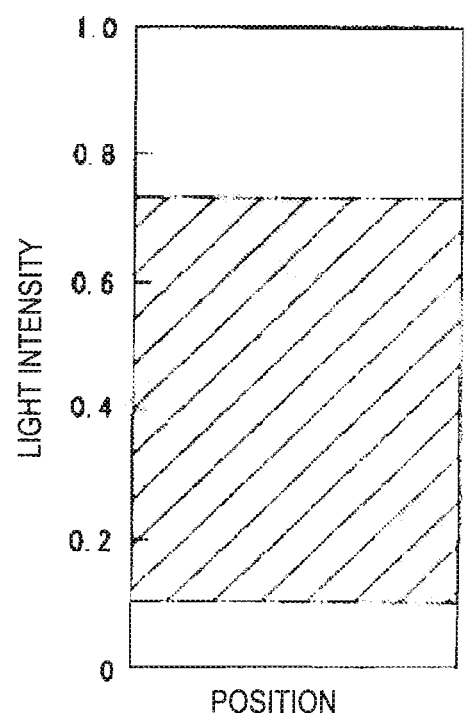

FIGS. 8A and 8B are graphs showing simulation results of light-intensity distribution of video image light. FIG. 8B is on the case that exiting optical path is switched over by the hologram structure as was done in the present embodiment while FIG. 8A is on the case that such switchover was not done. In the graphs, a video-image position is taken on the axis of abscissa while a light intensity normalized by the peak value is on the axis of coordinate. Note that the graphs depict a substantial variation range of light intensity because light-intensity variation is significant from point to point on the video image. Where optical-path switchover is not done, light intensity varies in the range of 0 to 1.0, as shown in FIG. 8A. Except for the singular point at which light intensity assumes 1.0, the substantial variation range of light intensity lies at 0 to 0.7. On the contrary, where optical-path switchover is done, light intensity varies in the range of 0.1 to 1.0, as shown in FIG. 8B. Incidentally, except for the singular point at which light intensity assumes 1.0, the substantial variation range of light intensity lies at 0.1 to 0.75. From this result, it is known that conspicuous concavo-convex of light intensity is moderated by switching the exiting optical path thus narrowing the variation range. Namely, by switching over the exiting optical paths, the video light is averaged over its light intensity thus suppressing the speckle pattern.

As detailed in the above, the illuminator according to the present embodiment has the laser-light source that irradiates laser light, the hologram structure that switches over the exiting optical paths for entering laser light, and diffraction optical elements in plurality that allow the laser light entering through the exiting optical path to exit by diffusion, so that the diffraction optical elements in plurality can illuminate the light modulator by superimposing nearly all the parts of exiting light. By switching over the exiting optical path of the laser light by use of the hologram structure, the light modulator can be illuminated with a plurality of kinds of light different in light and dark points. Because this averages the illumination light over its light and dark points, speckle patterns can be suppressed. In this case, because of no use of mechanical driving, e.g. vibrating/rotating the diffuser elements, etc. by means of a motor or the like, the illuminator can be reduced in size thus reducing the manufacturing cost. In addition, high-speed optical-path switchover is feasible and noise generation can be prevented.

Second Embodiment

Figure 9:
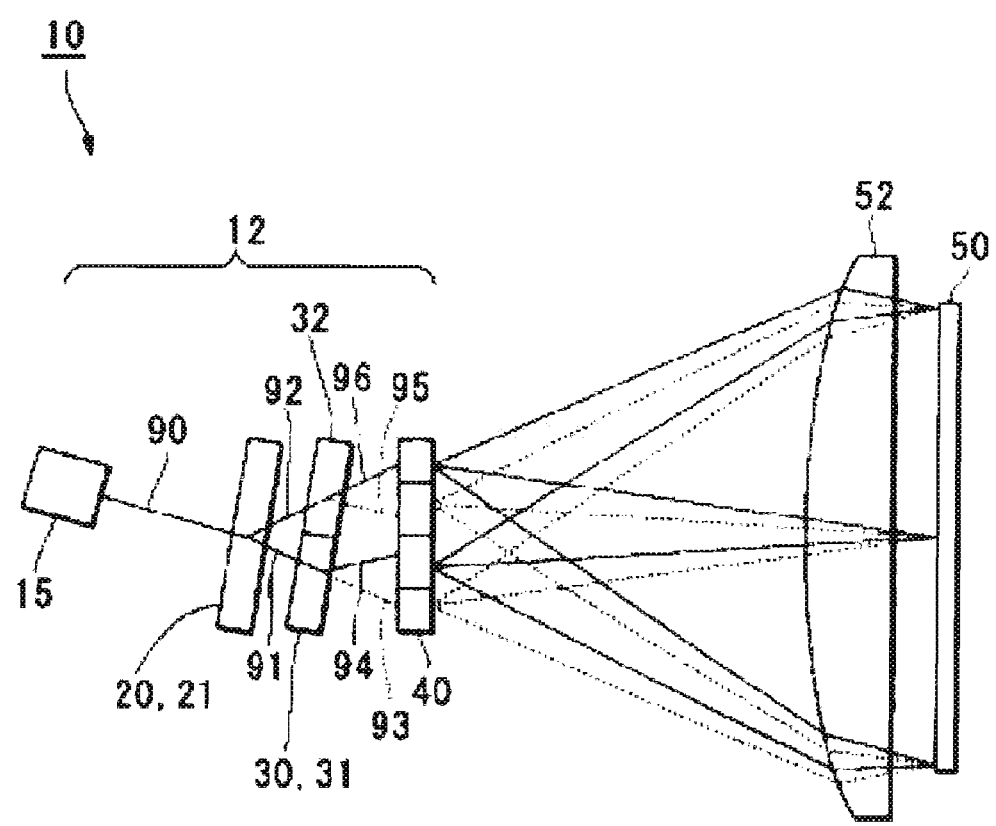
FIG. 9 is a schematic structural view of an illuminator according to a second embodiment.

Referring to FIG. 9, description is now made on an illuminator according to a second embodiment.

FIG. 9 is a schematic structural view of an illuminator according to the second embodiment. The illuminator in the second embodiment is different from the first embodiment in that a plurality of switch elements 21, 31 are provided on a laser-light path. Note that like or corresponding elements to those of the first embodiment are omitted to explain in detail.

In the downstream of the laser light source 15, a first switch device 20 having a first switch element 21 is arranged similarly to the first embodiment, as shown in FIG. 9. The first switch element 21 is to switch over between the exiting optical paths 91, 92 for entering laser light.

In addition, in the second embodiment, there is provided a second switch device 30 arranged two-dimensionally with a plurality of second switch elements 31, 32, in the downstream of the first switch element 21. The second switch elements 31, 32 are respectively made by hologram structures similar to that of the first embodiment. On the optical path 91 of the laser light exiting from the first switch element 21, there is arranged a first hologram structure 31. The first hologram structure 31 is to switch over between the exiting optical paths 93, 94 for entering laser light. Meanwhile, a second hologram structure 32 is arranged on the exiting optical path 92 of the laser light of from the first switch element 21. The second hologram structure 32 is to switch over between the exiting optical paths 95, 96 for entering laser light.

A diffusion illuminator 40 is arranged in the downstream of the second switch device 30. The diffusion illuminator 40 is arranged two-dimensionally with a plurality of diffusion-illuminating elements that allow the laser light entering through the exiting optical paths 93, 94, 95, 96 to exit with diffusion. The diffusion-illuminating elements are structured by diffraction optical elements similar to those of the first embodiment. Those are set up such that nearly all of the diffusion light exiting from the diffraction optical elements is superposed together on the incident-surface of the light modulator 50.

The illuminator is to be used by switching, at high speed, the exiting optical paths of from the first switch element 21, the second switch elements 31, 32. The exiting optical paths are switched over in a manner such that the illumination light t to the light modulator 50 is switched nearly 60 cycles per second. Namely, the electric-field application to the hologram structure 21 forming the first switch device 20 is switched in presence and absence at a frequency of approximately 15 Hz or greater while the electric-field application to the first and second hologram structures 31, 32 forming the second switch device 30 is switched in presence and absence at a frequency of approximately 30 Hz or greater. This allows for illuminating the light modulator 50 with four kinds of light passed four exiting optical paths 93, 94, 95, 96, approximately 15 cycles per second on each.

In this manner, the Illuminator according to the second embodiment had switch elements in plurality on the optical paths for laser light so that the light modulator 50 can be illuminated with light in a multiplicity of kinds. In this embodiment, because there were arranged, in two stages, the switch elements to switch over between two exiting optical paths, the light modulator 50 is to be illuminated with four kinds of light. In case there are arranged, in n-stages, the switch elements to switch over between two exiting optical paths, the light modulator 50 is to be illuminated with 2n kinds of light. By thus illuminating the light modulator 50 with light in multiplicity of kinds different in light and dark points, image light can be further averaged over as to its light and dark points. Accordingly, speckle patterns can be suppressed effectively.

Third Embodiment

Figure 10:
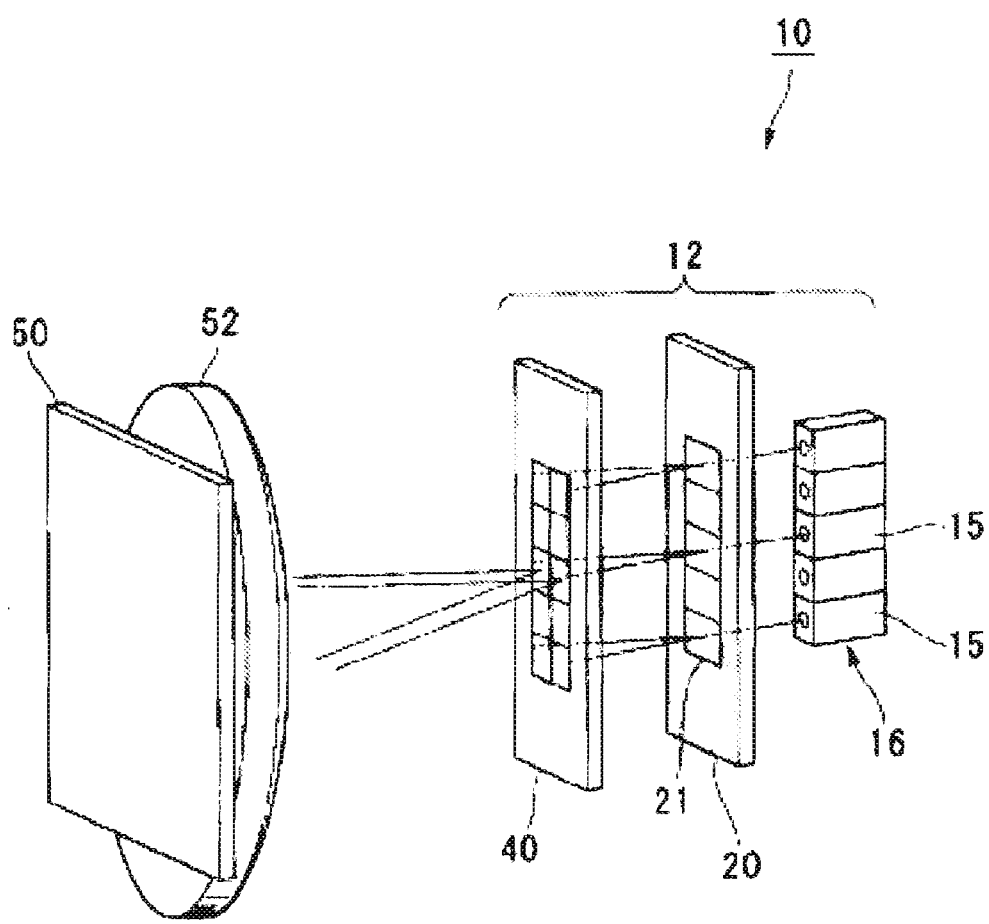
FIG. 10 is a schematic structural view of an illuminator according to a third embodiment.

Referring to FIG. 10, description is now made on an illuminator according to a third embodiment.

FIG. 10 is a perspective view of an illuminator according to the third embodiment. The illuminator 12 in the third embodiment is different from the first embodiment in that there are provided a plurality of laser light sources 15. Note that like or corresponding elements to those of the first embodiment are omitted to explain in detail.

As shown in FIG. 10, the illuminator in the third embodiment has a laser array 16 arranged with a plurality of laser light sources 15. In forming the laser array 16, a plurality of laser light sources may be formed on the same substrate or otherwise laser light sources formed separate may be connected together. Note that the laser array 16 wholly is incoherent though the individual laser light sources 15 are coherent.

In the downstream of the laser array 16, there is provided a switch device 20 arranged two-dimensionally with a plurality of switch elements 21. The switch elements 21 are respectively structured by hologram structures similarly to the first embodiment. The hologram structures are respectively arranged on the optical paths of laser light emitted from the laser light sources 15 so that each of laser light can be switched over between exiting optical paths.

In the downstream of the switch device 20, there is arranged a diffusion illuminator 40. The diffusion illuminator 40 is arranged two-dimensionally with a plurality of diffusion-illumination elements. The diffusion-illuminating elements are structured by diffraction optical elements similarly to the first embodiment. The diffraction optical elements are arranged corresponding to the exiting optical paths of from the switch device 20. Those are set up such that nearly all of the diffusion light exiting the diffraction optical elements can be superimposed together on the light-incident surface of the light modulator 50.

The illuminator 12 is to be used by switching over between the exiting optical paths of from the switch elements 21 at a high speed while irradiating laser light simultaneously from the laser light sources 15 in plurality constituting the laser array 16. The exiting optical paths are switched over in a manner such that the illumination light to the light modulator 50 is switched nearly 60 cycles per second. Namely, the electric-field application to the hologram structures in plurality forming the switch elements 21 is switched in presence and absence at a frequency of approximately 30 Hz or greater. Incidentally, the electric-field application to the hologram structures may be switched in presence and absence at different frequencies one from another. In addition, provided that the electric-field application to at least one of the hologram structures is switched in presence and absence at a frequency of approximately 30 Hz or greater, the electric-field application to another hologram structure can be switched in presence and absence at a frequency of approximately 30 Hz or smaller.

In this manner, the illuminator according to the third embodiment had laser light sources in plurality. Although the individual laser light sources are coherent, the plurality of laser light sources wholly is incoherent. Thus, the light modulator 50 can be illuminated with laser light in a plurality of kinds different in light and dark points. Therefore, averaging can be done over the light and dark points of image light by integration effects. This can suppress speckle patterns.

It is noted that the technical scope of the invention is not limited to the foregoing embodiments but includes various modifications to the embodiments within the scope not departing from the gist of the invention. Namely, the concrete materials and structures referred to in the embodiments are merely one examples and hence to be suitably modified.

The illuminator in the invention is applicable to such a projection display that projects image light through illuminating a spatial light modulator such as a front or rear type projector, and to such a projection display such as a slide projector. Meanwhile, the illuminator in the invention can be applied not limitedly to a projection display but to a printer using a laser light source, or the like.

What is claimed is:

1. An illuminator, comprising:
    a light source that irradiates light in a first optical path;
    a switch element that switches the irradiated light between the first optical path and a second optical path;
    a first diffusion-illuminating element that diffuses the light from the first optical path to illuminate an illumination area; and
    a second diffusion-illuminating element that diffuses the light from the second optical path to illuminate the illumination area such that the light exiting from the second diffusion-illuminating element is substantially superimposed on the light exiting from the first diffusion-illuminating element on the illumination area.

2. The illuminator according to claim 1, the switch element having an optical function layer, the optical function layer alternately layered with a polymer having birefringence and a liquid crystal, the illuminator further comprising:
    an electric-field application device for the optical function layer.

3. The illuminator according to claim 1, at least one of the diffusion-illuminating elements being a diffraction optical element for generating diffraction light.

4. The illuminator according to claim 1, further comprising:
    a plurality of switch elements provided on an optical path of the light.

5. The illuminator according to claim 1, further comprising:
    a plurality of light sources.

6. An image display, comprising:
    a light source that irradiates light in a first optical path;
    a switch element that switches the irradiated light between the first optical path and a second optical path;
    a light modulator that modulates the light from the light source;
    a first diffusion-illuminating element that diffuses the light from the first optical path to illuminate the light modulator;
    a second diffusion-illuminating element that diffuses the light from the second optical path to illuminate the light modulator such that the light exiting from the second diffusion-illuminating element is substantially superimposed on the light exiting from the first diffusion-illuminating element on the light modulator; and
    a projection system that projects light exiting from the light modulator.

7. The image display according to claim 6, the switch element having an optical function layer, the optical function layer alternately layered with a polymer having birefringence and a liquid crystal, the illuminator further comprising:
    an electric-field application device for the optical function layer.

8. The image display according to claim 6, at least one of the diffusion-illuminating elements being a diffraction optical element for generating diffraction light.

9. The image display according to claim 6, further comprising:
    a plurality of switch elements provided on an optical path of the light.

10. The image display according to claim 6, further comprising:
    a plurality of light sources.

11. The illuminator according to claim 2, the switch element having a hologram structure.

12. The image display according to claim 7, the switch element having a hologram structure.

13. The illuminator according to claim 1, the exiting light from the second diffusion-illuminating element superimposing at least a part of the exiting light from the first diffusion-illuminating element in the illumination area.

* * * * *